(12) United States Patent
Pirie et al.

(10) Patent No.: US 10,649,548 B2
(45) Date of Patent: May 12, 2020

(54) RETRACTABLE FANG ATTACHMENT FOR STYLUS

(71) Applicant: Microsoft Technology Licensing, LLC, Redmond, WA (US)

(72) Inventors: Gabriel J. Pirie, Seattle, WA (US); Bradley Edgar Clements, Fort Collins, CO (US); Casey Cook Zelig, Seattle, WA (US); Ryan Charles Eylander, Kent, WA (US); Anthony Reed, Redmond, WA (US); Perry Pierce, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 506 days.

(21) Appl. No.: 15/247,744

(22) Filed: Aug. 25, 2016

(65) Prior Publication Data
US 2018/0059817 A1 Mar. 1, 2018

(51) Int. Cl.
*G06F 3/0354* (2013.01)
*G06F 1/16* (2006.01)

(52) U.S. Cl.
CPC ........ *G06F 3/03545* (2013.01); *G06F 1/1626* (2013.01); *G06F 1/1643* (2013.01); *G06F 2200/1632* (2013.01)

(58) Field of Classification Search
CPC . G06F 3/03545; G06F 1/1626; H04M 1/0202
See application file for complete search history.

(56) References Cited

U.S. PATENT DOCUMENTS

| | | |
|---|---|---|
| 8,208,245 B2 | 6/2012 | Staats et al. |
| 9,025,318 B2 | 5/2015 | Ashcraft et al. |
| 9,025,321 B2 | 5/2015 | Liang |
| 9,110,629 B2 | 8/2015 | Leung |
| 9,158,384 B2 | 10/2015 | Whitt, III et al. |
| 9,170,662 B2 | 10/2015 | Kim |

(Continued)

FOREIGN PATENT DOCUMENTS

EP 2708974 A1 3/2014

OTHER PUBLICATIONS

Hay, Richard, "Using the HP Active Pen with the HP Spectre x360", Published on: May 29, 2015 Available at: http://winsupersite.com/hardware/using-hp-active-pen-hp-spectre-x360.

(Continued)

*Primary Examiner* — Abbas I Abdulselam
(74) *Attorney, Agent, or Firm* — Holzer Patel Drennan

(57) ABSTRACT

The structure and devices described herein provide an improved attachment for a peripheral device, such as a stylus, to a computing device when not in use. A stylus may have magnets contained therein that cooperate with magnets in a computing device to magnetically secure the stylus to the computing device when not in use. In addition, a retractable interlock may automatically extend from the stylus when the stylus is in proximity of the computing device. The interlock is received in a receptacle of the computing device to provide an improved attachment through the mechanical interaction of the interlock and the receptacle. The interlock is biased in a retracted position and automatically extends through magnetic attraction with the computing device.

20 Claims, 8 Drawing Sheets

(56) References Cited

U.S. PATENT DOCUMENTS

| | | | | |
|---|---|---|---|---|
| 2004/0108997 A1* | 6/2004 | Lee | ................... | G06F 1/1626 |
| | | | | 345/179 |
| 2008/0297328 A1* | 12/2008 | Crawford | ................. | G08B 6/00 |
| | | | | 340/407.2 |
| 2010/0182283 A1* | 7/2010 | Sip | ................... | G06F 1/1626 |
| | | | | 345/179 |
| 2010/0219217 A1 | 9/2010 | Andochick | | |
| 2010/0252337 A1* | 10/2010 | Yang | ................... | G06F 3/03545 |
| | | | | 178/19.01 |
| 2011/0192857 A1 | 8/2011 | Rothbaum et al. | | |
| 2014/0029182 A1* | 1/2014 | Ashcraft | ................... | G06F 1/26 |
| | | | | 361/679.4 |
| 2014/0049894 A1* | 2/2014 | Rihn | ................... | G06F 1/1616 |
| | | | | 361/679.27 |
| 2014/0109181 A1* | 4/2014 | Pomerantz | ............. | G06F 21/44 |
| | | | | 726/2 |
| 2015/0035809 A1* | 2/2015 | Kim | ................... | G06F 1/1656 |
| | | | | 345/179 |
| 2015/0116286 A1 | 4/2015 | Stewart et al. | | |
| 2016/0277835 A1* | 9/2016 | Kim | ................... | H04R 1/028 |
| 2018/0350201 A1* | 12/2018 | Levesque | ............. | G06Q 20/352 |

OTHER PUBLICATIONS

"Using Surface Pen with single button on flat edge", Retrieved on: Apr. 26, 2016 Available at: https://www.microsoft.com/surface/en-in/support/hardware-and-drivers/surface-pen-pro-4.

Guim, Mark, "6 other ways to attach the Surface Pen to the Surface Pro 3", Published on: May 21, 2014 Available at: http://www.windowscentral.com/6-ways-attach-surface-pen-surface-pro-3.

"Apps, Pairing and Getting Started with Bamboo Stylus fineline", Published on: May 5, 2015 Available at: http://bamboo.wacom.com/apps-pairing-and-getting-started-with-bamboo-stylus-fineline/.

Adhiya, Dhvanesh, "Best Thin-tip iPad Stylus That Writes Like a Pen", Retrieved on: Apr. 26, 2016 Available at: http://www.igeeksblog.com/best-thin-tip-ipad-stylus/.

U.S. Appl. No. 15/076469, Pirie, et al., "Accessory attach for devices with glass or smooth surfaces", filed Mar. 21, 2016.

* cited by examiner

RETRACTABLE FANG ATTACHMENT FOR STYLUS

BACKGROUND

Personal computers utilize various mechanisms for receiving input. For example, many personal computers allow a keyboard, a mouse, a touchpad, or other such devices to provide input to the personal computer. Mobile personal computers, such as tablets, smart phones, laptops, and even many non-mobile computers, may incorporate a touch screen that can receive input directly through contact, or near-contact, with the screen.

A stylus is one preferred implement for inputting information into a computer through the touch screen. A stylus is typically shaped like a pen or a pencil and has a writing end designed for entering information, such as handwritten text or drawings, and a tail end that may function as an eraser to remove information from the touch screen. A stylus may additionally include a button for providing command inputs to the computer, such as resembling a right-mouse click of a traditional computer mouse. However, a stylus is a relatively small accessory that may easily be misplaced or lost.

SUMMARY

The systems, methods, and techniques described herein provide for an improved stylus incorporating a retractable fang into the barrel of the stylus that provides a mechanical attachment mechanism to a computing device when the stylus is attached to the computing device. The fang is biased to automatically retract into the stylus when not being used to attach the stylus to the computing device. The addition of a protruding fang provides increased holding power and resistance against a moment force such as rolling the stylus off the side of the computing device. The fang may be biased into a retracted position by springs, magnets, elastics, or some other device that imparts a retraction force on the fang. The fang may be extended through magnetic interaction with a cooperating structure on the computing device that overcomes the retraction force, such that when the stylus approaches the computing device, the fang automatically extends from the stylus.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

Figure 1:
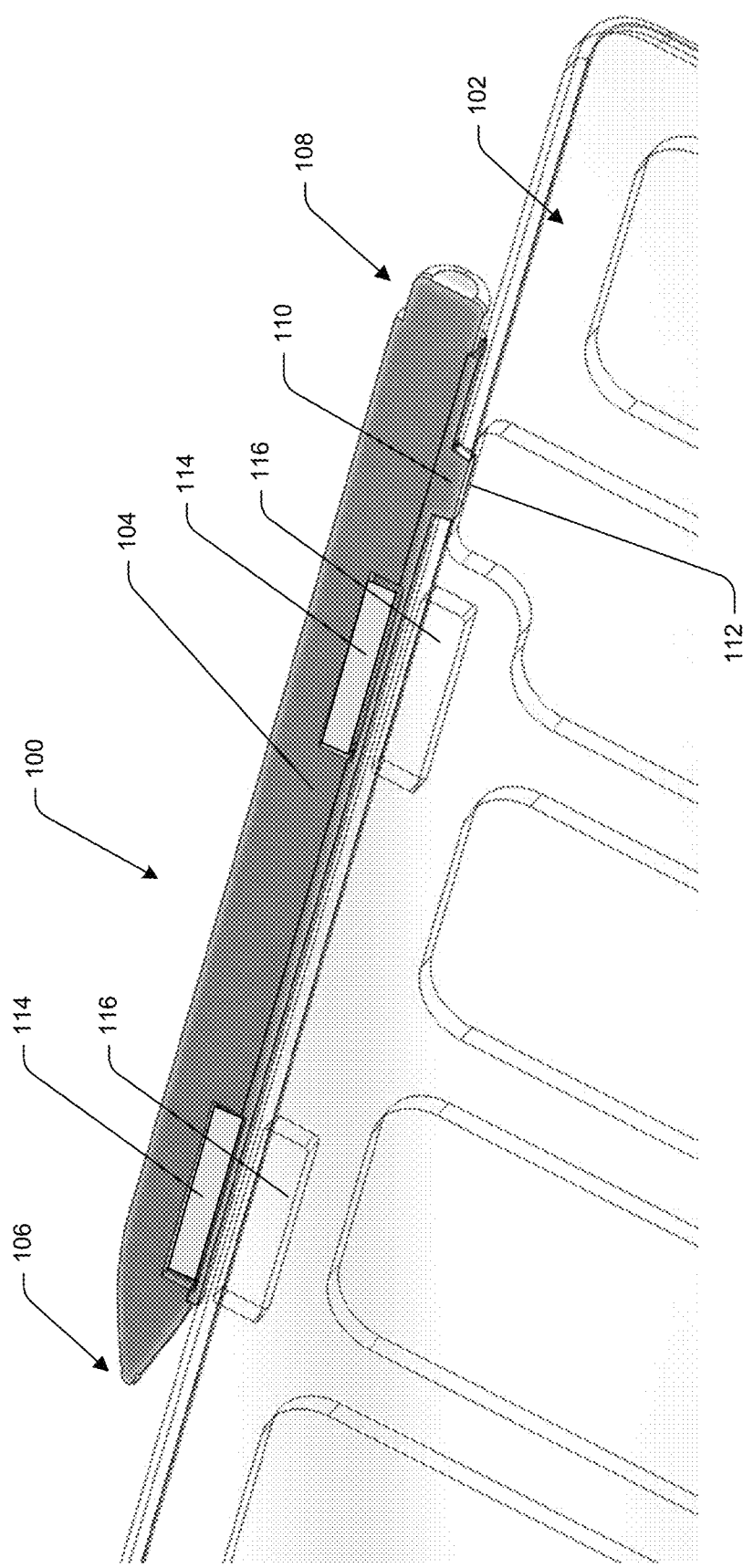
FIG. 1 is an illustration of one example of a stylus incorporating a retractable fang.

A stylus is a writing instrument designed to be used with a computing device. A stylus is a relatively small accessory and they are frequently lost, misplaced, or accidentally dislodged from their storage location on the computing device. The system described herein provides an attachment solution for a stylus to a computing device. The attachment solution comprises a fang that is able to automatically extend from the stylus when used as an interlock to secure the stylus to a computing device and automatically retract into the stylus when the stylus is moved away from the computing device.

The fang may extend and retract due to magnetic attraction. For example, there may be attraction between the fang and the computing device. More specifically, the computing device may have a recess formed therein that is sized and shaped to receive the fang to provide a secure mechanical attachment of the fang to the computing device. The fang may be attracted to one or more materials that form the recess, or are in close proximity to the recess. Similarly, the fang may likewise be attracted to one or more materials within the stylus that cause the fang to retract into the stylus in the absence of an overriding extension force. An extension force causes the fang to extend from the stylus and a retraction force causes the fang to withdraw into the stylus.

An extension force may be created by a magnetic field which causes attraction between the fang and the recess of the computing device. Either the fang, the recess, or both, may be formed of one or more magnets. In some instances, both the fang and the recess are magnetic and are oriented to attract one another. In other instances, only one of the fang or the recess are magnetic and the other is formed of a magnetically attractive material, such as a ferrous alloy or composite.

A retraction force may be created by a magnetic field which causes attraction between the fang and the interior of the stylus such that the fang withdraws into the stylus. The fang may be magnetic, a magnet may be positioned within the stylus, or both, such that a retraction force causes the fang to withdraw into the stylus. The retraction force may additionally or alternatively be imparted by one or more springs, such as a coil spring, a leaf spring, a torsion spring, some other type of spring, by an elastic material, or some other type of material that biases the fang in a retracted position.

In some implementations, the retraction force is relatively weak when compared to the extension force at a given distance of the stylus from the computing device, such that the extension force is able to override the retraction force within a threshold distance, such as about 6 mm, 8 mm, 10 mm, 30 mm, or more. In use, as the stylus approaches the recess of the computing device, once the fang is within a threshold distance from the computing device, the extension force will override the retraction force and the fang will extend from the stylus. The magnitude of the extension force imparted by magnetic attraction is dependent upon the distance between the fang and the recess of the computing device. Therefore, when the stylus is moved away from the computing device a sufficient distance, the retraction force will be stronger than the extension force and the fang will automatically retract into the stylus.

With reference to FIG. 1, a stylus 100 works in conjunction with a computing device 102 to allow precise input on a touch screen of the computing device. The stylus 100 typically has a barrel 104 that forms a writing end 106 and a tail end 108. The writing end 106 may be configured with any manner of tip for cooperating with the touch screen to enable a user to input information to the computing device with the stylus 100. A stylus 100 may be configured to input text similar to using a pencil or a pen on paper, or the stylus 100 may be configured to function as a brush, crayon, marker, charcoal, or some other type of device for inputting information into the computing device as could be applied to paper or canvas.

The computing device 102 configured to accept input from a stylus will typically include a touch screen, and in many cases, includes a capacitive inductance touch screen that is able to detect a point on the screen where the stylus 100 makes contact with the screen, and may also be able to detect the position of the stylus 100 in close proximity to the screen. The touch screen may also be configured to detect pressure applied by the stylus 100, and in some cases, the stylus will detect pressure exerted against the touch screen and send data to the computing device indicating the pressure at which the stylus 100 is being pressed against the touch screen.

The computing device 102 may be any type of computing device that may be configured with a screen for receiving input from a stylus 100. Suitable types of computing devices 102 can include a desktop computer, a laptop computer, a smartphone, a tablet computer, a gaming console, a television, or some other computing device 102 that is capable of being operated as described herein.

As illustrated, the stylus 100 has a barrel 104 that is generally an elongate member having any suitable cross sectional shape. In many implementations, the stylus 100 has a hollow elongate barrel 104 and is configured to resemble a pen or pencil and may have a cross-sectional shape that resembles a circle, hexagon, octagon, or some other shape that allows the stylus 100 to be used in the manner it is designed for. The barrel 104 has an interior sidewall defining the interior of the hollow barrel 104. The stylus 100 further has a fang 110 that selectively protrudes from the barrel 104 in a direction generally orthogonally to the longitudinal axis of the barrel 104. In some implementations, the fang 110 is configured to fit into a correspondingly shaped receptacle 112 in the computing device 102.

As used herein, the term "fang" is a broad term and is generally used to describe a protrusion from the stylus 100 that is configured to engage with a corresponding receptacle 112 in a computing device. The fang 110 may include hooks, surface texture, grooves, bosses, or other methods of cooperating with the receptacle 112 to allow the stylus 100 to be secured to the computing device 102. The terms "fang" and "interlock" may be used interchangeably throughout and should not be construed to indicate that the stylus is "locked" to the computing device, but rather, provides an improved attachment through the mechanical interaction of the interlock and the computing device.

In addition to the fang, one or more stylus magnets 114 can be carried within the barrel 104 of the stylus. The magnets may be any suitable type of material or structure that exhibits a magnetic field, such as electromagnets, permanent magnets, bar magnets, ring magnets, button magnets or otherwise. However, in some instances, the stylus magnets 114 are rare earth magnets, such as neodymium magnets.

The computing device 102 may likewise have device magnets 116 that are carried by the computing device 102 and are spaced to coincide, or closely coincide with, the stylus magnets 114. The stylus magnets 114 and the device magnets 116 are oriented such that they attract one another. The stylus magnets 114 and device magnets 116 are preferably selected and configured such that they hold the stylus 100 onto the computing device 102, even without the fang 110. However, the addition of the fang 110 provides a more secure way of attaching the stylus 100 to the computing device 102 and further inhibits the stylus 100 from accidentally releasing from the computing device 102.

The fang 110 may be configured with one or more magnets, which may be any suitable type of permanent or electromagnet, but in some instances, the fang 110 has a rare earth magnet therein. The receptacle 112 likewise may be configured with magnets that are configured to attract the fang 110 for a secure attachment therein. Of course, the fang 110 could be incorporated into the computing device 102 and the receptacle 112 could be formed into the stylus 112.

Figure 2:
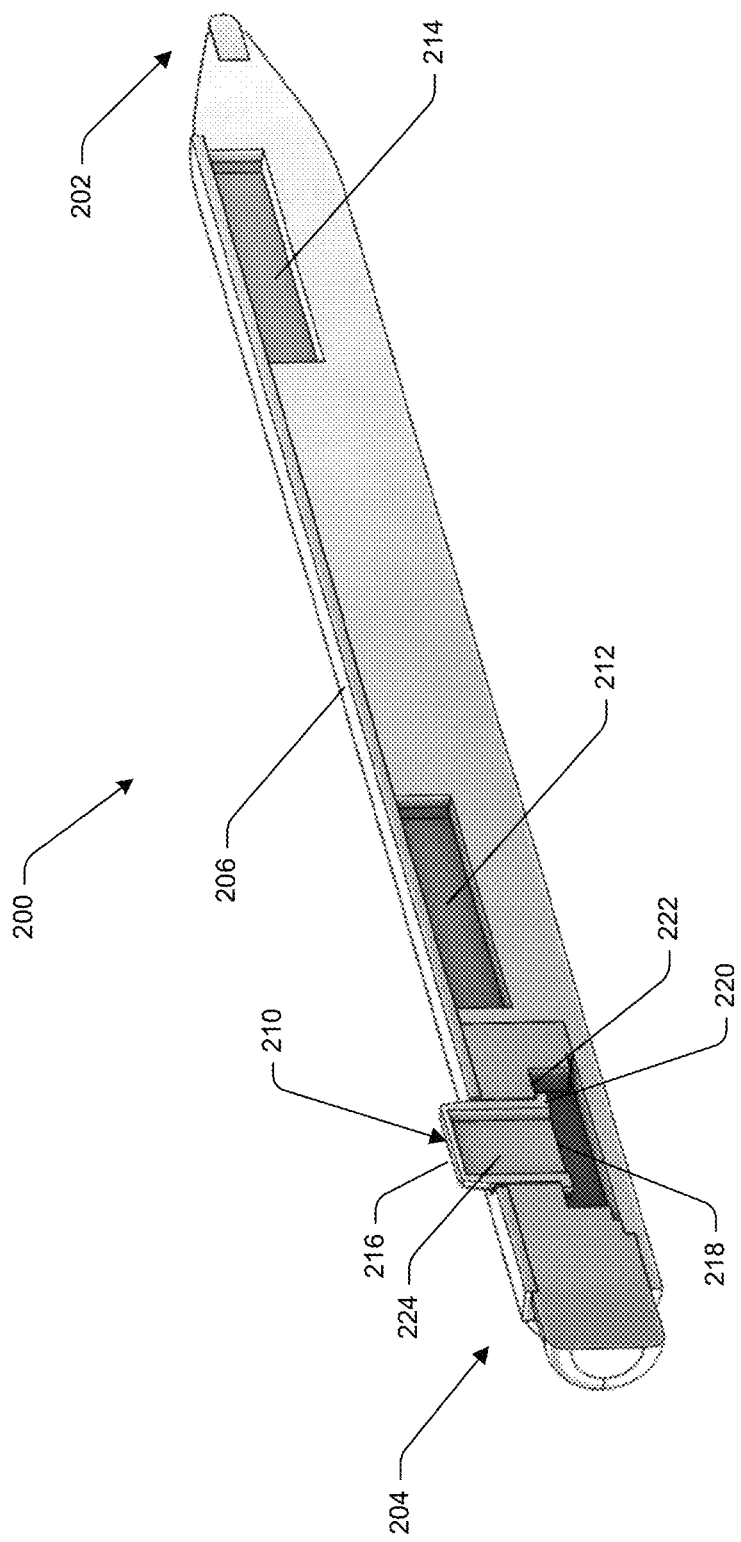
FIG. 2 is a cross-sectional view of an implementation of a stylus taken along the longitudinal axis of the stylus.

With reference to FIG. 2, a stylus 200 includes a writing end 202 and a tail end 204. A barrel 206 may be formed with an aperture to accommodate a fang 210 protruding therethrough. Magnet apertures 212, 214 may be formed in the barrel 206 to carry magnets within the barrel 206 as previously described. While the illustrated example shows apertures formed in the barrel 206, other attachment methods for the stylus magnets may be used, such as adhesives, clips, formed integrally during molding, mechanical fasteners, or otherwise.

The fang 210 may have a distal end 216, e.g., an end that protrudes from the barrel 205, and a proximal end 218, e.g., an end that remains within the barrel 206. The proximal end 218 may contain transverse protrusions 220 that interfere with an engaging surface 222 within the barrel 206 to inhibit the fang 210 from being removed from the barrel 206 and that define a maximum extension of the fang 210 from the barrel 206. The barrel 206, or structure within the barrel 206, may define a slidable path for the fang 210 as it slides in a distal (extending) direction and a proximal (retracting) direction.

While the implementations of FIGS. 1 and 2 illustrate a single fang disposed closer toward the tail end of the stylus than the writing end of the stylus, it should be appreciated that more than one fang could be incorporated into a stylus and/or the fang(s) could be located anywhere along the length of the barrel 206.

As illustrated, the fang 210 may be formed as a hollow body defining an interior cavity 224. The cavity 224 may be configured to hold a fang magnet, and as used herein, implementations that describe the fang 210 as being magnetic may refer to the fang 210 containing a magnet therein, or may refer to the fang being formed from one or more magnets.

Figure 3A:
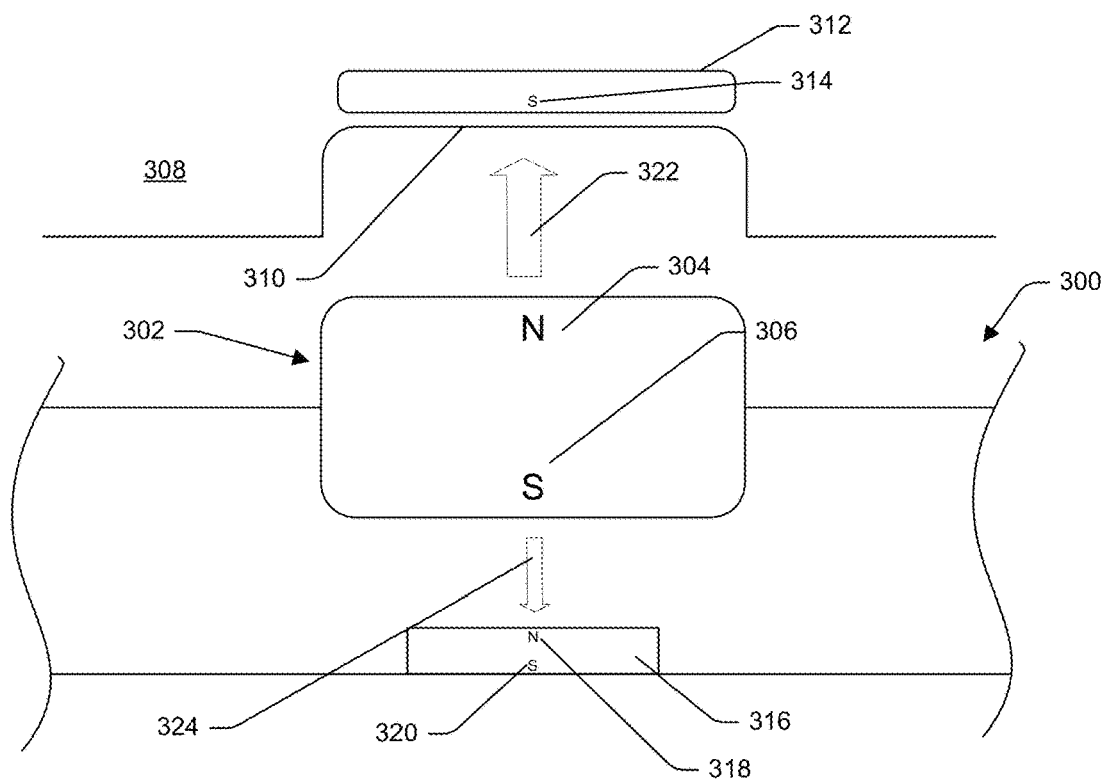
FIG. 3a is an illustration of a stylus showing another example of a retractable fang in an extended position.
Figure 3B:
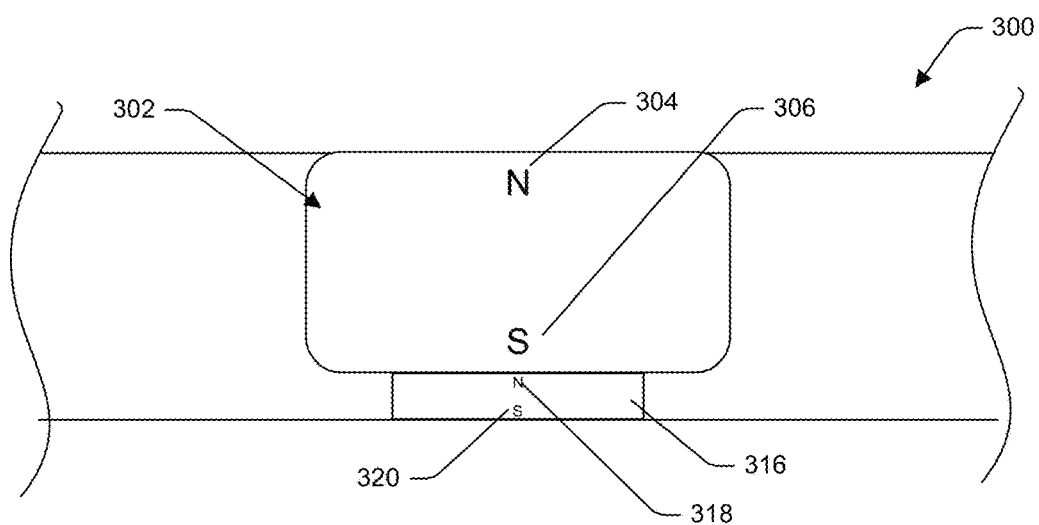
FIG. 3b is an illustration of the retractable fang of FIG. 3a in a retracted position.

With reference to FIGS. 3a and 3b, a stylus 300 incorporates a fang 302 configured to extend and retract into the stylus 300. The fang 302 is magnetic, which may be accomplished by incorporating a permanent magnet into the fang 302, such that the fang 302 exhibits a North pole 304, and a South pole 306. While the illustration shows that the North pole 304 is at the distal end of the fang 302, this is largely arbitrary and the South pole 306 may be located at the distal end of the fang 302.

A computing device 308 is configured with a recess 310 that is shaped to receive the fang 302. The computing device 308 may further include a device magnet 312 which may be oriented such that its South pole 314 is positioned adjacent the exterior of the computing device 308 at the recess 310. In use, as the stylus 300 approaches the computing device 308, the fang 302 is attracted to the device magnet 312 which extends the fang 302 outwardly away from the stylus 300. That is, when the fang 302 is within close proximity to the recess 310, the North pole 304 of the fang 302 is attracted to the South pole 314 within the recess 310 of the computing device 308 and the fang 302 extends from the stylus 300.

The stylus 300 may further include a retracting magnet 316 within the stylus 300 at a location in the barrel that is diametrically opposed to the fang 302. The retracting magnet 316 may be oriented within the stylus 300 such that, absent any overriding external magnetic fields, the fang 302 is attracted to the retracting magnet 316. Consequently, when the stylus 300 is moved away from the recess 310 in the computing device 308, the fang 302 retracts into the stylus 300 as shown in FIG. 3b.

The retracting magnet 316 may be any suitable magnet that provides retraction of the fang 302 into the stylus 300, such as by orienting the retracting magnet 316 such that its North pole 318 is facing the fang 302 and its South pole 320 is away from the fang 302. However, the retracting magnet 316 is preferably chosen such that its attraction of the fang 302 is overridden when the fang 302 is in close proximity to the recess 310 of the computing device 308. In other words, the device magnet 312 is selected to have a stronger magnetic attraction of the fang 302 at a specified distance than the retracting magnet 316 such that the fang 302, when in proximity to the device magnet 312, will move away from the retracting magnet 316 and extend outwardly from the stylus 300 and be attracted to the device magnet 312. The magnetic field of a magnetic dipole is approximately proportional to the inverse cube of the distance from the dipole. Therefore, at double the distance from the magnet, the magnetic field strength will be reduced (approximately) by a factor of 8. Therefore, magnets can be selected such that the fang 302 automatically extends or retracts based upon its proximity to the receptacle 310 of the computing device 308.

In some implementations, the retracting magnet 316 may be omitted and a ferromagnetic material may be placed within the barrel to which the fang 302 is attracted in the absence of an overriding extension force 322. An extension force 322 is any force that tends to cause the fang 302 to extend away from the stylus, such as an external magnetic field. Without an overriding extension force 322, the fang 302 may be biased in a retracted position within the stylus 300 through a retraction force 324. The retraction force 324 may be provided through magnetic attraction of the fang 302 and the retracting magnet 316 or the ferromagnetic material within the barrel.

Figure 4A:
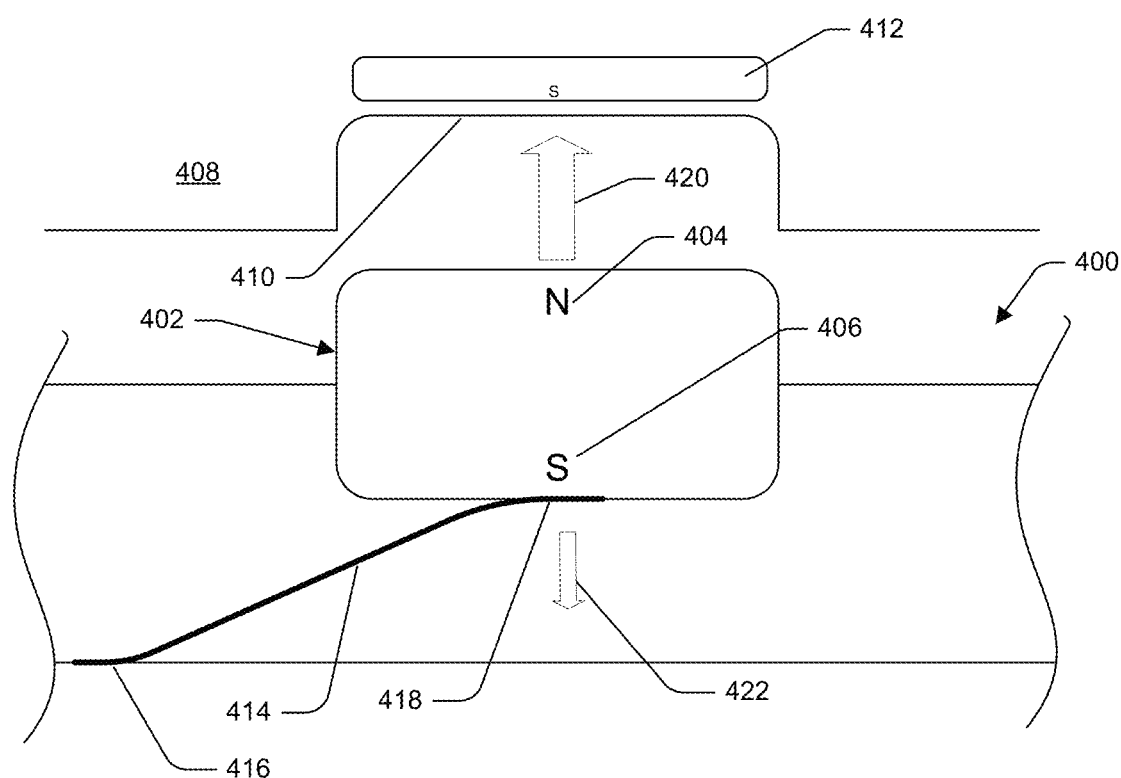
FIG. 4a is an illustration of a stylus showing another example of a retractable fang in an extended position.
Figure 4B:
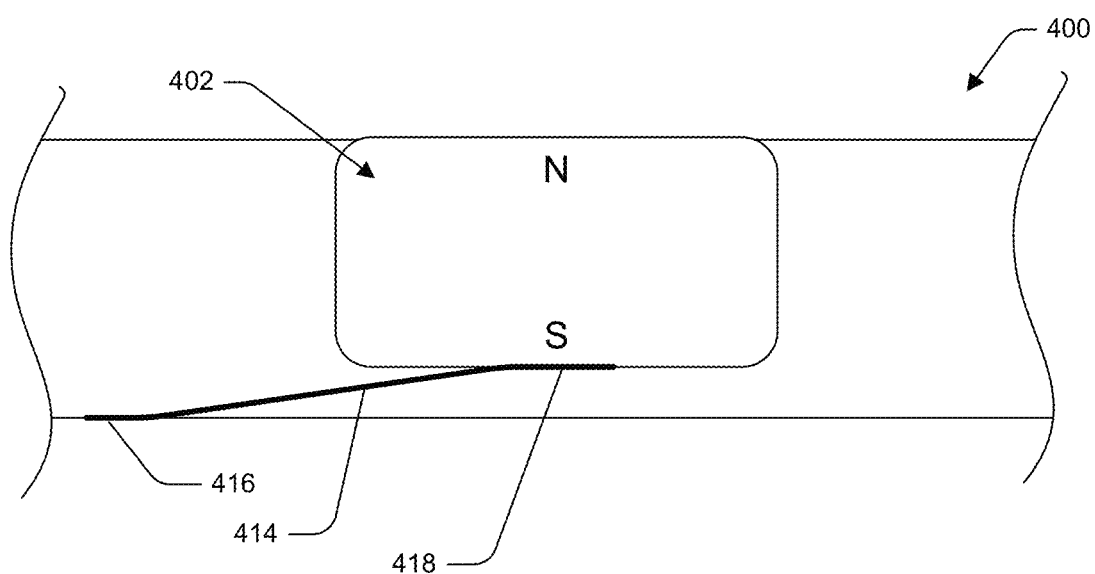
FIG. 4b is an illustration of the retractable fang of FIG. 4a in a retracted position.

With reference to FIGS. 4a and 4b, a stylus 400 has a fang 402 configured to extend or retract through an aperture in the barrel of the stylus 400. In some implementations, the fang 402 is magnetic (e.g., the fang itself is a magnet or has a magnet as a part of the fang) and exhibits a North pole 404 and a South pole 406. A computing device 408 has a recess 410 formed therein configured to accept the fang 402. The computing device 408 may further have a device magnet 412 positioned adjacent the recess 410 such that the device magnet 412 attracts the fang 402. That is, as the fang 402 comes within proximity of the recess 410, the device magnet 412 attracts the fang 402 and causes it to extend outwardly from the stylus 400 toward the recess 410. In other instances, the recess 410 may be formed of magnetically attractive material, or have such a material in close proximity to cause magnetic attraction of the fang 402. Suitable magnetically attractive materials may include paramagnetic or ferromagnetic materials, such as steel, iron, cobalt, nickel, and any composites that include ferromagnetic materials.

A spring 414, such as a leaf spring, may provide a biasing force on the fang 402 that biases the fang 402 in a retracted position, as shown in FIG. 4b. The spring 414 may have a first end 416 connected to an inner wall of the barrel, or to a structure that is close to the inner wall of the barrel generally opposite to the aperture through which the fang 402 extends. The spring 414 may have a second end 418 attached to the fang 402. As described, the magnetic interaction between the fang 402 and the recess 410 creates an extension force 420 that causes the fang 402 to extend away from the stylus 402 when the fang 402 is within a predetermined distance from the recess 410. In the absence of an overriding extension force 420 that causes the fang 402 to extend, such as an external magnetic field for example, the spring 414 imparts a retraction force 422 that causes the fang 402 to retract, or withdraw, into the stylus 400. Any number of variously configured support structures may be implemented to impose travel limits on the fang 402 for extension and retraction. For example, one or more interference stops may dictate the distance of extension of the fang 402 outside the barrel and the maximum retraction position of the fang 402 within the barrel of the stylus.

Figure 5A:
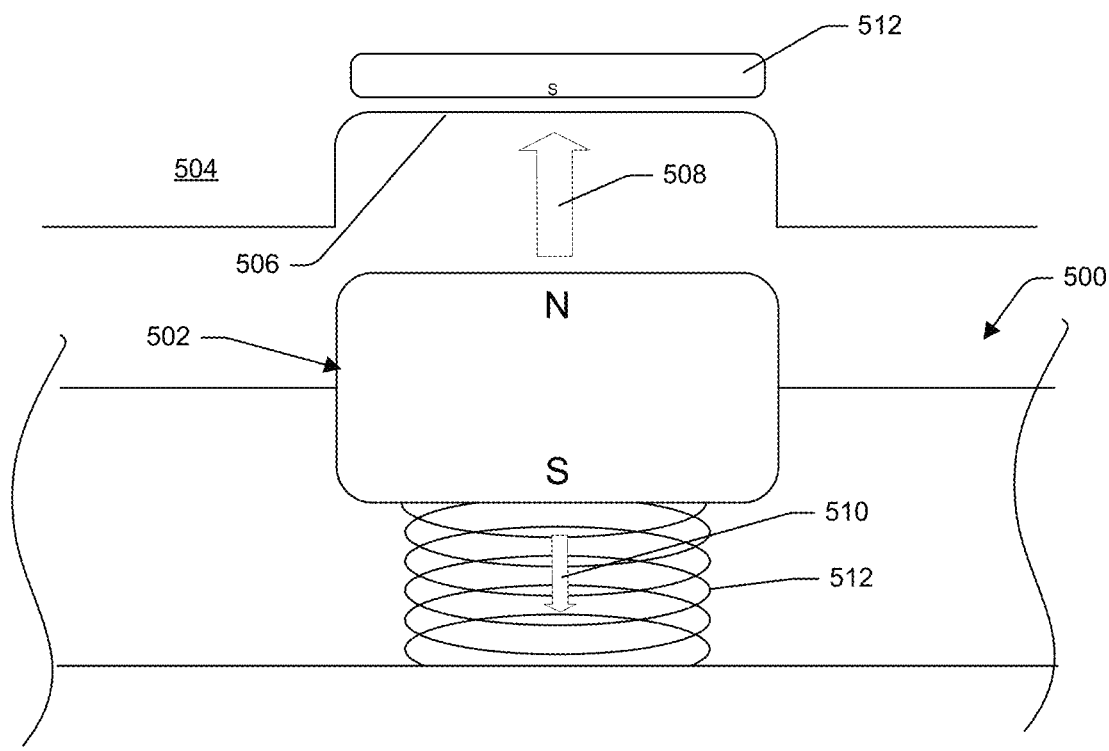
FIG. 5a is an illustration of a stylus showing another example of a retractable fang in an extended position.
Figure 5B:
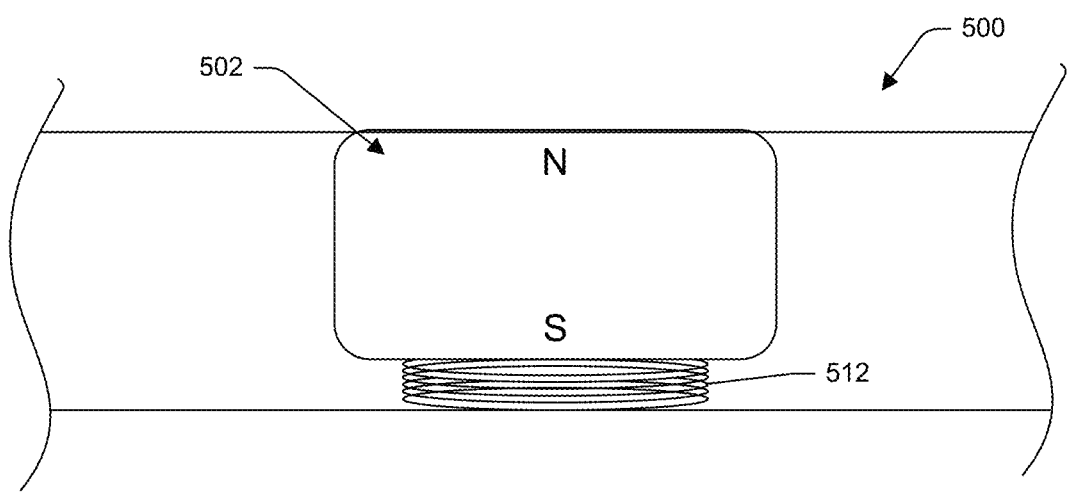
FIG. 5b is an illustration of the retractable fang of FIG. 5a in a retracted position.

With reference to FIGS. 5a and 5b, a stylus 500 has a fang 502 configured to extend or retract through an aperture in the barrel of the stylus 500. A computing device 504 includes a receptacle 506 (e.g., a recess) configured to receive the fang 502. An extension force 508 tends to cause the fang 502 to extend toward the receptacle 506 when the fang 502 is within a predetermined distance from the receptacle 506. The extension force 508 may be created through magnetic attraction between the fang 502 and one or more materials near the receptacle. Of course, the receptacle may be formed of magnetic materials, magnetically attractive materials, or have these materials within the computing device in proximity to the receptacle 506.

In some implementations, a computing device 504 may have a housing, or computer case, that holds the internal computer components. The receptacle 506 may be formed as a recess in the housing and a permanent magnet 512 may be located within the housing adjacent to the recess. Alternatively, a magnetically attractive material 512 may be located within the housing adjacent to the recess. The fang 502 may have a permanent magnet as part of the fang 502 which may be configured to cooperate with the receptacle 506 to cause a magnetic attraction between the fang 502 and the receptacle 506. It should be understood that the magnetic attraction between the fang and the receptacle 506 could be caused by interaction between magnets and/or magnetically attractive materials. In other words, there may be one magnet disposed in either the fang 502 or the receptacle 506 and a magnetically attractive material disposed in the other one of the fang 502 or the receptacle 506. Alternatively, there may be magnets located in both the fang 502 and the receptacle 506. In either case, the magnetic attraction between the fang 502 and the receptacle 506 creates the extension force 508.

The extension force 508 caused by magnetic interaction is a vector that has a magnitude and a direction. The magnitude of the extension force 508 is approximately inversely proportional to the cube of the distance between the fang and the receptacle. Thus, as the fang 502 approaches the receptacle 506, the magnitude of the extension force 508 increases exponentially.

The fang 502 is initially biased in a retracted position through a retraction force 510. As illustrated in FIGS. 5a and 5b, a coil spring 512 may be used to provide the retraction force 510. The coil spring 512 may be attached within the stylus 500 and may further be attached to the fang 502. A spring provides a retraction force 510 according to Hook's Law, which states that the force required to extend or compress a spring by some distance is proportional to that distance. That is: F=kX, where k is a spring constant related to the stiffness of the spring, and X is some distance compared to the total possible deformation of the spring. Therefore, a spring 512 can be selected based upon the travel limits of the fang 508 and a desired retraction force 510 to be imparted upon the fang 502 at its maximum extension position.

Absent any extension force 508, the fang 502 remains retracted within the stylus 500. However, as the fang 502 approaches a receptacle 506, an extension force 508 is imparted on the fang 502 due to the magnetic interaction between the fang 502 and the receptacle 506. As the fang 502 approaches the receptacle 506, the extension force 508 increases exponentially until the extension force 508 overrides the retraction force 512 caused by the spring and the fang 502 extends outwardly from the stylus 500. The fang 502 will be attracted to the receptacle 506 where it provides additional mechanical attachment for the stylus 500 to the computing device 504.

Once the stylus 500 is moved away from the computing device 504 and the retraction force 510 overcomes the extension force 508, the fang withdraws into the stylus 500. Therefore, when the stylus 500 is in use by a user, the fang 502 is automatically retracted and therefore does not inhibit usability or detract from the aesthetics of the stylus 500.

The fang 502 could additionally be configured to provide an electrical pathway between the stylus 500 and the computing device 504. As one example, the fang 502 could be a universal serial bus (USB) connector that automatically extends and retracts and fits within a USB receptacle on the computing device. The USB connector could be used, for example, to charge a battery within the stylus, or to send or receive data such as for storage of data on memory located within the stylus 500 for later retrieval. The fang 502 could additionally be used for some other purpose to provide increased functionality to the stylus 500.

Figure 6A:
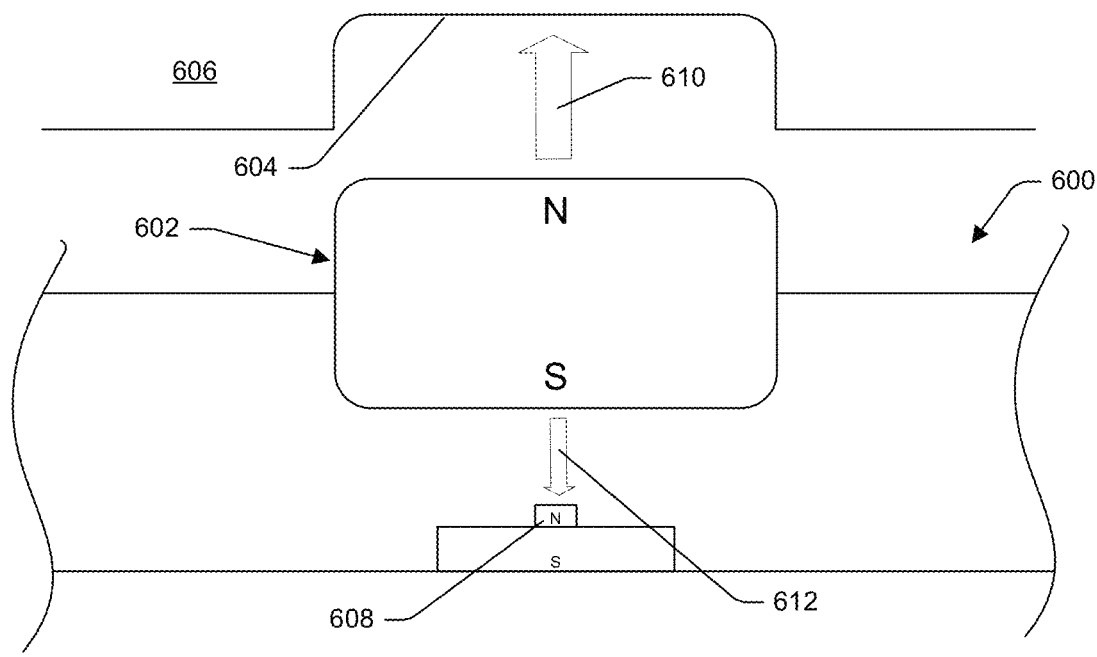
FIG. 6a is an illustration of a stylus showing another example of a retractable fang in an extended position in which the fang can be used to actuate a button of the stylus.
Figure 6B:
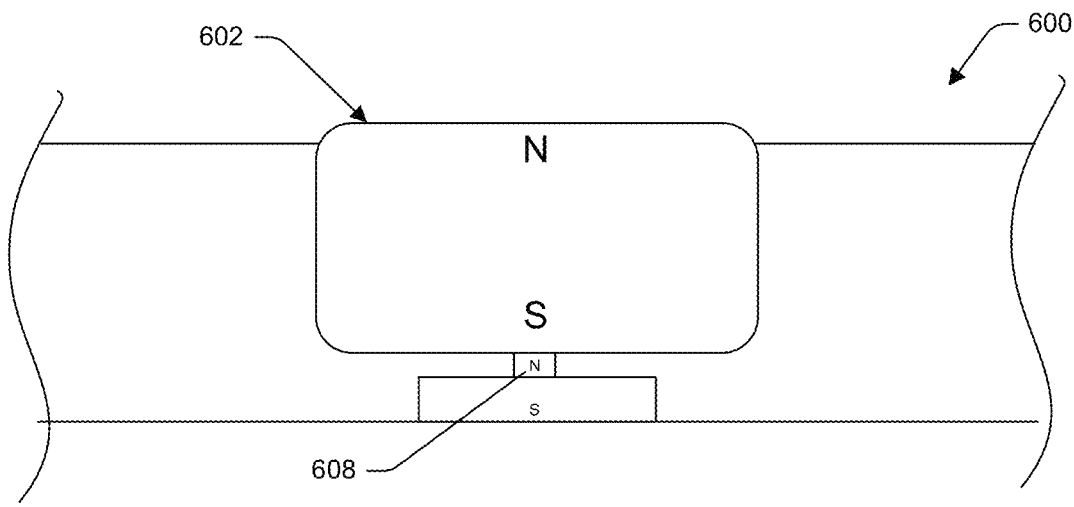
FIG. 6b is an illustration of the stylus of FIG. 6a showing the retractable fang in a retracted position in which the fang can be used to actuate a button of the stylus.

As illustrated in FIGS. 6a and 6b, a stylus 600 includes a retractable fang 602 that is configured to fit within a receptacle 604 of a computing device 606, as previously described. The stylus 600 may additionally have an actuator 608, such as a button or switch, located within the stylus 600 that is disposed adjacent the fang 602 when the fang 602 is fully retracted, as shown in FIG. 6b.

The extension force 610 may be provided in any suitable manner and through any suitable mechanism and may be according to the descriptions of the previous examples disclosed herein. The retraction force 612 may be created through magnetic interaction between the fang 602 and the actuator 608 itself. That is, the actuator 608 may be formed of magnetically attractive material, or incorporate a magnet as part of the actuator 608. While the illustrated implementation shows that the actuator 608 is magnetic, in some implementations, the actuator is not magnetic and the retraction force 612 can be implemented through some alternative mechanism. For example, the retraction force 612 may be imparted by a spring, a material having relatively high elasticity, or some other device or structure.

When the fang 602 is fully retracted, the fang 602 is adjacent to, or in some cases is touching, the actuator 608. The fang 602 may slightly protrude from the stylus 600 in its fully retracted position and resemble a button on the stylus 600. Accordingly, the fang 602 may be pressed by a user and will, in turn, press on the actuator 608. The actuator 608 may be configured to result in any sort of action, such as emitting a Bluetooth low energy signal to launch an application or service on the computing device 606, or may activate a laser pointer, a voice recorder, a light, or provide some other functionality to the stylus 600 or the computing device 606.

The fang 602 may further be used as a power switch for the stylus 600. For example, the fang 602 is configured to move to its fully retracted position in response to the stylus 600 being removed from the computing device 606. In this configuration, the fang 602 may engage with the actuator 608, which may be an electrical switch, to provide power for the stylus 600. That is, the fang 602, in its fully retracted position, completes an electrical circuit and closes a switch. Conversely, when the fang 602 is extended, such as when the stylus 600 is attached to a computing device 606, the electrical switch is open and electrical power is not provided to the stylus 600. In this way, the battery life of the stylus 600 is improved because the stylus 600 automatically shuts off power to the stylus 600 when it is attached the computing device 606 and therefore not in use.

Figure 7:
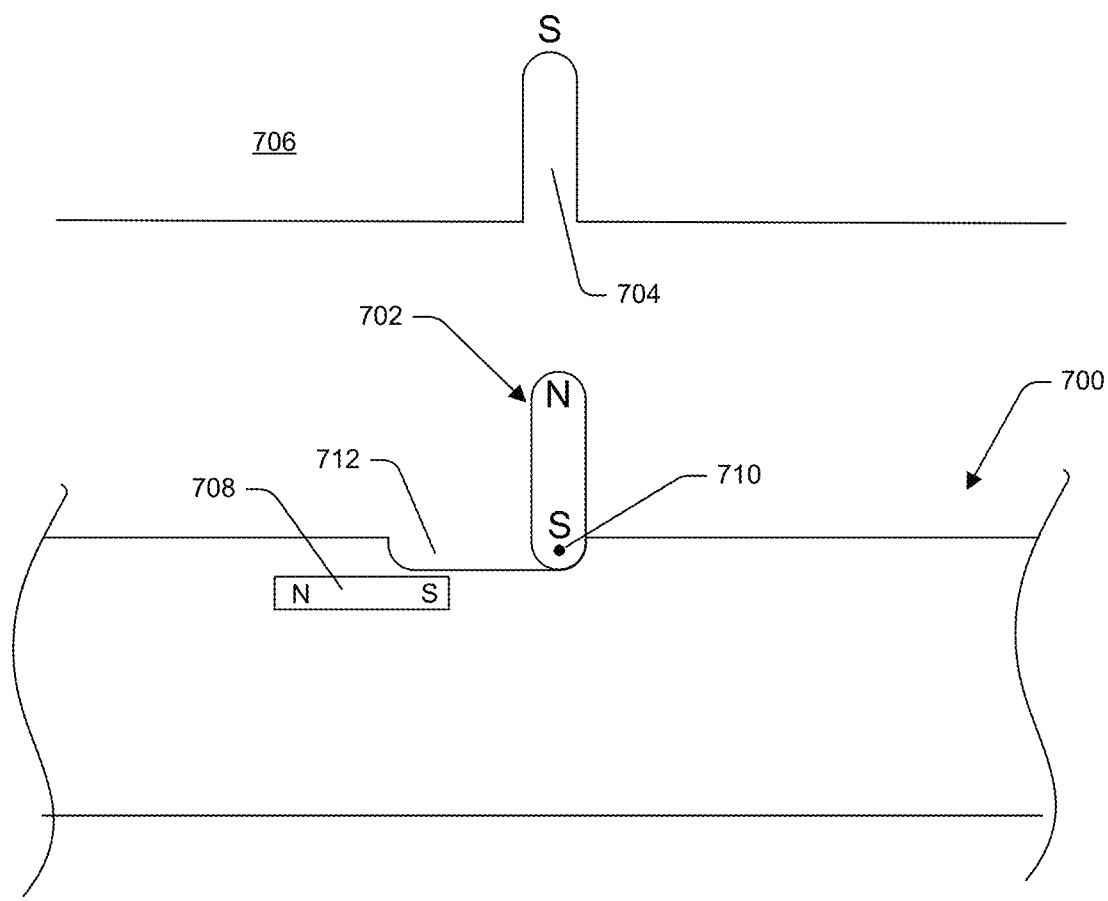
FIG. 7 is an illustration of another example of a stylus incorporating a retractable fang showing the fang in an extended position.

With reference to FIG. 7, a stylus 700 includes a fang 702 that is configured to extend away from the stylus 700 when in close proximity to a receptacle 704 of a computing device 706. In this example, the fang 702 may be biased against the stylus 700 by a stylus magnet 708 located within the stylus 700. The fang 702 may be magnetic, as illustrated, or may be formed of a magnetically attractive material. Alternatively, the retraction force on the fang 702 may bias the fang 702 in a position that is withdrawn into the stylus 700 and may be imparted by a spring, such as a torsion spring positioned adjacent a hinge 710 that couples the fang 702 to the stylus 700. As illustrated, in the extended position, the fang 702 pivots about the hinged connection 710 and extends generally perpendicularly to the longitudinal axis of the stylus 700. In the retracted position, the fang 702 lies within a recess 712 formed into the barrel of the stylus 700, and may be considered "retracted" or "withdrawn" into the stylus 700.

Figure 8:
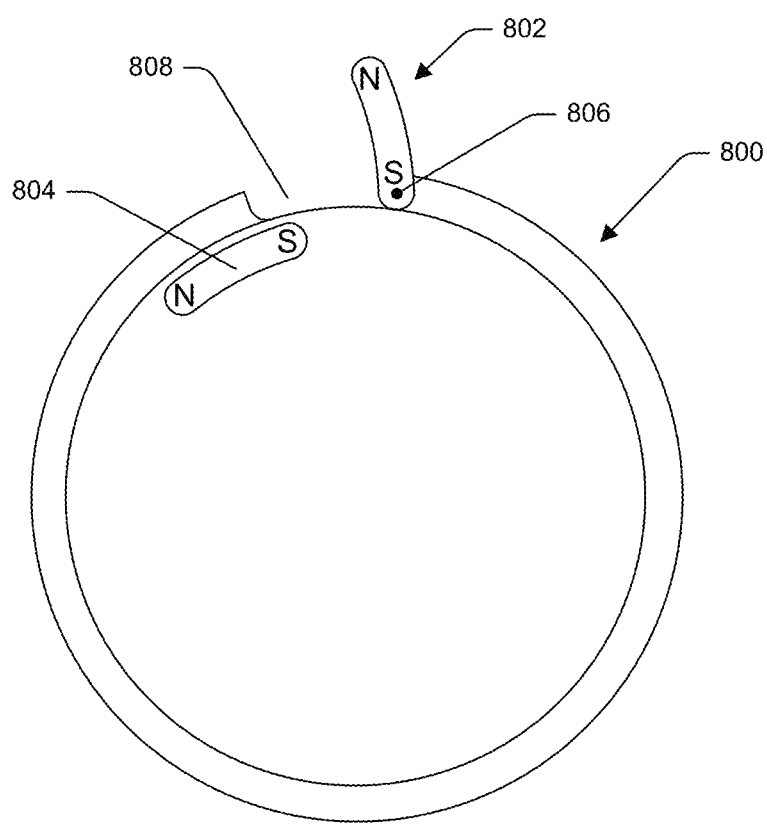
FIG. 8 is a cross-sectional illustration of another example of a stylus incorporating a retractable fang showing the fang in an extended position.

With reference to FIG. 8, a stylus 800 includes a fang 802 that is configured to extend away from the stylus 800 when in close proximity to a receptacle of a computing device. In this example, the fang 802 may be biased against the stylus 800 by a stylus magnet 804 located within the stylus 800. The fang 802 may be magnetic, as illustrated, or may be formed of a magnetically attractive material. Alternatively, the retraction force on the fang 802 may bias the fang 802 in a position that is withdrawn into the stylus 800 and may be imparted by a spring, such as a torsion spring positioned adjacent a hinge 806 (or pin) that couples the fang 802 to the stylus 800. As illustrated, in the extended position, the fang 802 pivots about the hinged connection 806 and extends generally perpendicularly to the longitudinal axis of the stylus 800. In the retracted position, the fang 802 lies within a recess 808 formed into the barrel of the stylus 800.

While the foregoing description focuses on providing an automatically extending and retracting fang to a stylus, the concepts described herein could be implemented on virtually any accessory device that could benefit from a protruding fang to provide additional mechanical and magnetic clamping to another device. For example, the concepts could be applied to a mouse, a removable display, sensors, or virtually any other input or output device that may be attached to the computing device for storage when not in use.

Example Clauses

According to some implementations a stylus for a computing device includes an elongated hollow barrel having an aperture formed in a sidewall thereof. A magnetic interlock is configured to selectively move between an extended position in which the magnetic interlock extends through the aperture and a retracted position in which the magnetic interlock is substantially fully within the elongated hollow barrel. The stylus includes a biasing mechanism for biasing the magnetic interlock in the retracted position.

The magnetic interlock may form a protrusion configured to fit within a receptacle of the computing device when in the extended position. The interlock may be configured to automatically move to the extended position when placed within a predetermined distance of the receptacle of the computing device.

The biasing mechanism may be a spring configured to exert a force on the magnetic interlock to bias the magnetic interlock in the retracted position. The biasing mechanism may alternatively provide a magnetic attraction to move the magnetic interlock to the retracted position.

In some instances, an electrical button may be disposed within the elongated hollow barrel and adjacent to the magnetic interlock when in the retracted position and the electrical button may be configured to be actuatable by depressing the magnetic interlock.

According to other examples, a method for attaching an accessory to a computing device includes providing an accessory having a retractable magnetic interlock moveable between a first position in which the retractable magnetic interlock extends away from the accessory, and a second position in which the retractable magnetic interlock does not extend away from the accessory; providing a computing device having a receptacle configured to receive the retractable magnetic interlock; causing, through magnetic attraction, the retractable magnetic interlock to move from the second position to the first position; and attaching the accessory to the computing device via insertion of the retractable magnetic interlock into the receptacle.

The method may further include pressing the retractable magnetic interlock while in the second position to actuate a button within the accessory to send a signal to the computing device. In some instances, the retractable magnetic interlock moves from the second retracted position to the first extended position through magnetic attraction. A spring exerting a spring force may cause the retractable magnetic interlock to move from the first position to the second position.

According to other examples, a device includes an interlock moveable within the device between a first position in which the interlock is positioned substantially within the device and a second position in which the interlock extends away from the device. The interlock may be moveable from the first position to the second position by magnetic attraction. A biasing mechanism within the device provides a retraction force to the interlock to bias the interlock in the first position.

In some cases, the interlock is disposed in a stylus and is configured to attach the stylus to a computing device. In other examples, the interlock is disposed in a computing device and is configured to engage a corresponding recess in a stylus, mouse, keyboard, display, storage device, or some other device. Likewise, the interlock may be located in a peripheral device and configured to allow attachment for either storage, data communication, charging or the like. In some cases, an interlock may be incorporated into a peripheral device such as a mouse, keyboard, stylus, monitor, touch pad, track ball, headphones, speakers, or any other such device for storage, data communication, or charging.

An aperture in the device may be provided to allow the interlock to move through the aperture between the first position and the second position. A spring may be disposed within the device and configured to bias the interlock in the first position.

In some instances, the interlock is magnetic and is configured to move from the first position to the second position upon the presence of an external magnetic field that overcomes the retraction force. The biasing mechanism may be a magnet disposed within the device and configured to attract the interlock to maintain the interlock in the first position.

An electronic switch may be positioned within the device and may be actuated by the interlock when in the first position. In some cases, the interlock is configured to create an electrical pathway between the device and a second device when the device is coupled to the second device via the interlock. For example, the electrical pathway may electricity to the device to charge a battery within the device, or may provide data communication between the device and the second device.

The biasing mechanism may be a ferromagnetic plate disposed within the device that is configured to attract the interlock to maintain the interlock in the first retracted position.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:

1. A stylus for a computing device, the stylus comprising:
   an elongated hollow barrel, the elongated hollow barrel having an aperture formed in a sidewall thereof;
   a magnetic interlock configured to selectively move between an extended position in which the magnetic interlock extends through the aperture and a retracted position in which the magnetic interlock is substantially fully within the elongated hollow barrel; and
   a biasing mechanism for biasing the magnetic interlock in the retracted position.

2. The stylus as in claim 1, wherein the magnetic interlock forms a protrusion configured to fit within a receptacle of the computing device when in the extended position.

3. The stylus as in claim 2, wherein the magnetic interlock is configured to automatically move to the extended position when placed within a predetermined distance of the receptacle of the computing device.

4. The stylus as in claim 1, wherein the biasing mechanism is a spring configured to exert a force on the magnetic interlock to bias the magnetic interlock in the retracted position.

5. The stylus as in claim 1, wherein the biasing mechanism provides a magnetic attraction to move the magnetic interlock to the retracted position.

6. The stylus as in claim 1, further comprising an electrical button disposed within the elongate hollow barrel and adjacent to the magnetic interlock when in the retracted position, the electrical button configured to be actuatable by depressing the magnetic interlock.

7. A method for attaching an accessory to a computing device, the method comprising:
providing an accessory having a retractable magnetic interlock moveable between a first position in which the retractable magnetic interlock extends out of and away from the accessory, and a second position in which the retractable magnetic interlock is positioned substantially within the accessory;
providing a computing device having a receptacle configured to receive the retractable magnetic interlock;
causing, through magnetic attraction, the retractable magnetic interlock to move from the second position to the first position; and
attaching the accessory to the computing device via insertion of the extended retractable magnetic interlock into the receptacle.

8. The method as in claim 7, further comprising pressing the retractable magnetic interlock while in the second position to actuate a button within the accessory to send a signal to the computing device.

9. The method as in claim 7, further comprising causing, through magnetic attraction, the retractable magnetic interlock to move from the first position to the second position.

10. The method as in claim 7, further comprising causing, through a spring force, the retractable magnetic interlock to move from the first position to the second position.

11. A device, comprising:
an interlock moveable within the device between a first position in which the interlock is positioned substantially within the device and a second position in which the interlock extends out of and away from the device, wherein the interlock is configured to fit within a receptacle of a second device when in the second position, the interlock moveable from the first position to the second position by magnetic attraction; and
a biasing mechanism within the device that provides a retraction force to the interlock to bias the interlock in the first position.

12. The device as in claim 11, further comprising an aperture in the device and wherein the interlock is configured to move through the aperture between the first position and the second position.

13. The device as in claim 11, wherein the biasing mechanism is a spring disposed within the device configured to retain the interlock in the first position.

14. The device as in claim 11, wherein the interlock is magnetic and is configured to move from the first position to the second position upon the presence of an external magnetic field, the external magnetic field overcoming the retraction force.

15. The device as in claim 11, wherein the biasing mechanism is a magnet disposed within the device and configured to attract the interlock to maintain the interlock in the first position.

16. The device as in claim 11, further comprising an electronic switch within the device, the electronic switch configured to be actuated by the interlock when in the first position.

17. The device as in claim 11, wherein the interlock is configured to create an electrical pathway between the device and the second device when the device is coupled to the second device via the interlock.

18. The device as in claim 17, wherein the electrical pathway is configured to provide electricity to the device to charge a battery within the device.

19. The device as in claim 17, wherein the electrical pathway is configured to provide data communication between the device and the second device.

20. The device as in claim 11, wherein the biasing mechanism is a ferromagnetic plate disposed within the device and configured to attract the interlock to maintain the interlock in the first position.

* * * * *